Sept. 13, 1966   R. ROMANINI   3,272,564
AIR BRAKE VALVE

Filed Dec. 21, 1964   2 Sheets-Sheet 1

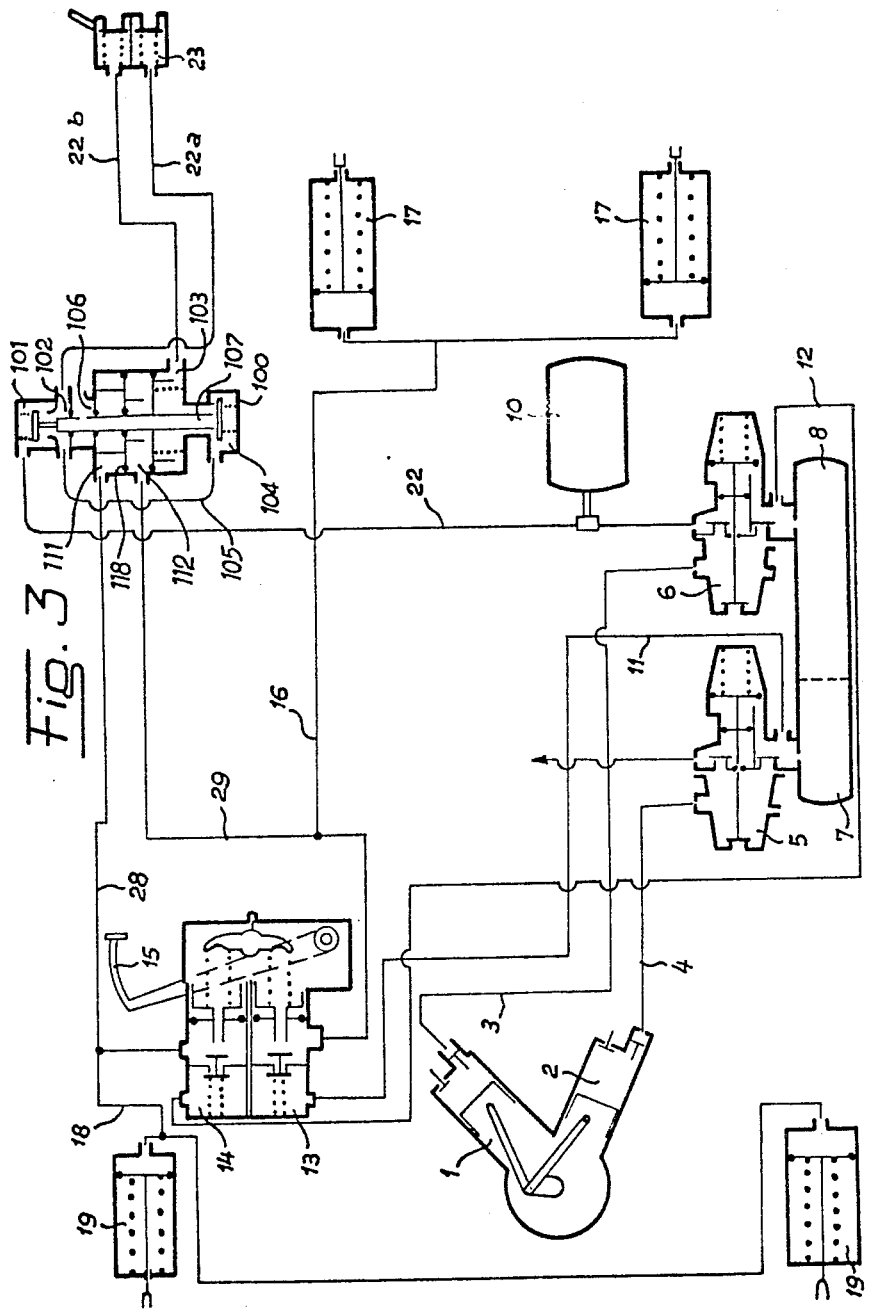

United States Patent Office 3,272,564
Patented Sept. 13, 1966

3,272,564
AIR BRAKE VALVE
Romeo Romanini, Rivoli, Turin, Italy, assignor to Lancia
& C. Fabbrica Automobili-Torino S.p.A., Turin, Italy
Filed Dec. 21, 1964, Ser. No. 419,709
Claims priority, application Italy, Jan. 8, 1964,
497/64
4 Claims. (Cl. 303—7)

This invention relates to an air brake of the type in which the compressed air reservoir for braking the trailer is mounted on the truck and is connected through an automatic regulating valve to the pedal actuated brake and to the automatic brake.

This invention provides an improved automatic regulating valve which permits automatic braking of the trailer in the event of accidental breakage of a main conduit of the pedal actuated brake. In the case of damage to the latter, a sudden braking is effected instead of a gradual one, as soon as the brake pedal is operated.

A braking system for trucks adapted to haul a trailer, which employs an automatic regulating valve of the type referred to, is a further feature of this invention.

According to this invention there is provided an automatic regulating valve for a compressed air brake mechanism, interposed between the trailer brake reservoir mounted on the truck and the pedal actuated brake conduit and automatic brake of the type wherein the pedal actuated brake conduit is normally open to the atmosphere and the automatic brake conduit normally connects with the said reservoir, characterized by the fact that the valve comprises means for closing the pedal actuated brake conduit with respect to the atmosphere and connecting it with the automatic brake conduit upon an application of the brakes and for cutting off the said reservoir both from the controllable brake conduit and automatic brake conduit, while maintaining the said two conduits interconnected in the event of damage to the controllable brake conduit or on braking.

Further characteristic features and advantages of this invention will be understood from the appended description referring to the accompanying drawings, given by way of example, wherein:

FIGURE 3 is a diagrammatical view of a brake mechanism empolying the valve shown in FIGURE 2.

The same reference numerals are employed throughout the figures to denote corresponding parts.

Figure 1:
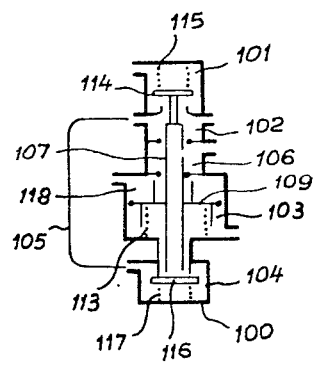
FIGURE 1 is a diagrammatical view of an automatic adjusting valve controlled by one truck braking circuit.

The brake mechanism shown in FIGURE 3 essentially comprises two compressors 1, 2 mechanically interconnected and pneumatically independent of each other, which supply pressure air to reservoirs 8, 7 for the truck brake through conduits 3, 4 and regulators 6, 5. The regulator 6 additionally supplies pressure air to a reservoir 10 for the trailer brake, mounted on the truck.

Truck braking circuits extend from the reservoirs 7, 8 and comprise conduits 11, 12, respectively, leading to a pair of distributors 13, 14 operated from the brake pedal 15.

A conduit extends from the distributor 13 and branches into a conduit 16 connected with the rear wheels brake cylinders 17, and a conduit 29 connected to an automatic regulating valve 100 which shall be described in detail hereafter. A conduit extending from the distributor 14 branches into a conduit 18, connecting with the fore wheels brake cylinders 19, and a conduit 28 extending to the automatic regulating valve 100. A trailer service conduit 22b and trailer emergency conduit 22a extend from the automatic regulating valve 100 and are connectable through a coupling 23 with corresponding conduit sections mounted on the trailer, not shown on the drawing. The automatic regulating valve 100 is connected by a conduit 22 to the reservoir 10.

All the components described heretofore, with the exception of the automatic regulating valve 100, are known in the art and do not require a detailed description.

The automatic regulating valve 100 according to this invention, has a chamber 101 communicating with the conduit 22 connecting with the reservoir 10, a chamber 102 communicating with the emergency conduit 22a, a chamber 103 connected to the service conduit 22b, a lower chamber 104 connected to one end of a conduit 105, the other end of which is connected to the chamber 102, and a discharge chamber 106 opening to the atmosphere. A hollow plunger 107 is mounted in the body of the valve 100, the plunger being open at the bottom and closed at the top, and having its wall formed with a hole 108 (FIG. 2), opening into the discharge chamber 106. A diaphragm 109 is fixedly mounted on the piston 107 and defines above the chamber 103 a chamber 118 for compressed air from the truck braking circuit. In the construction shown in FIGURE 2 a diaphragm 110 is slidably mounted on the plunger 107 and subdivides the chamber 118 into a chamber 111 communicating with the conduit 28, and a chamber 112 communicating with the conduit 29. A spring 113 acts on the diaphragm 109 and urges the plunger 107 upwardly. A valve member 114 urged towards its closed position by a light spring 115, is normally biased to its open position by the plunger 107 and alternately connects the chamber 101 with the chamber 102 and disconnects it therefrom. A valve member 116 urged to its closed position by a spring 117 is adapted to be opened by the plunger 107 to connect the chamber 103 with the chamber 104.

Figure 2:
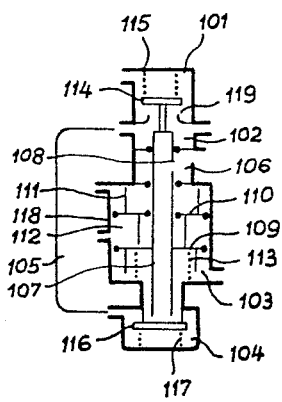
FIGURE 2 is a diagrammatical view of an automatic adjusting valve modified for control by two independent truck braking circuits.

The automatic regulating valve 100 shown in FIGURE 1 is similar to the valve shown in FIGURE 2, from which it distinguishes only in that it is deprived of the slidable diaphragm 110 in the chamber 118, the latter communicating with the truck braking circuit.

The brake mechanism shown in FIGURE 3 operates as follows.

Under normal conditions or when the brake is inoperative, the automatic regulating valve 100 is in the position as shown, in which the plunger 107 is lifted, the reservoir 10 connects through conduit 22, chamber 101 and chamber 102 with the emergency conduit 22a. The service conduit 22b connects with the atmosphere through chamber 103, hollow in the plunger 107, hole 108 and discharge chamber 106.

When the brakes are applied by acting on the brake pedal 15, the rear and fore wheel brake cylinders on the truck 17—17 and 19—19, respectively, are actuated and compressed air is forced through conduits 28, 29 to the chamber 118 which pushes the diaphragm 109, consequently the plunger 107 downwardly, the plunger firstly bearing on the valve member 116 to close discharge from the member 103, then throwing the valve chamber 116 open, whereby the service conduit 22b is connected with the emergency conduit and reservoir 10 through chamber 103, chamber 104, conduit 105, chamber 102, chamber 101 and conduit 22. The spacing of the base of the plunger 107 from the valve member 116 is smaller than the spacing of the valve member 114 from its seat 119, so that the valve member 116 opens while the valve member 114 is still open. Since the pressure in chamber 118 substantially equals the pressure in the chamber 103, the plunger 107 is maintained by the diaphragm 109 in a balanced condition, both valve members 116, 114 being open.

In the event of damage to the service conduit 22b, pressure in the chamber 103 connecting with the said conduit falls below the pressure prevailing in the chamber 118, whereby compressed air in the latter moves the plunger 107 further downwardly against the action of the spring 113, thereby closing the valve member 114 and shutting off the reservoir 10. As the valve 116 remains open, the conduit 22a connects with the service conduit 22b through chamber 102, conduit 105, chamber 104 and chamber 103, so that a fall in pressure in the conduit 22b results in a fall in pressure in the conduit 22a whereby the trailer is automatically braked. Since the reservoir 10 mounted on the truck is closed while the trailer brake reservoir mounted on the trailer is partly emptied on actuation of the trailer brakes, whereby the air pressure therein is lower than the air pressure in the reservoir 10, which, on release of the brake pedal avoids any self-braking of the trailer brakes, so that the trailer brake and truck brake are simultaneously released.

It will be understood that constructional details and embodiments can be widely varied with respect to the example described and shown without departing from the scope of the appended claims.

What I claim is:

1. A tractor-trailer braking system comprising; first pressure means, automatic control valve means, tractor service line means connected to said first pressure means and said automatic valve means, second pressure means connected to said automatic valve means, trailer service conduit means and trailer emergency conduit means connected to said valve, said automatic valve means having first valve means normally connecting said second pressure means with said trailer emergency conduit means, second valve means normally connecting said trailer service conduit means to the atmosphere and pressure operated means responsive to an increase in tractor service conduit pressure to interconnect said trailer service conduit means with said trailer emergency conduit means and said second pressure means while closing said second valve means, said pressure operated means further responsive to a drop in pressure in said trailer service conduit means to close said first valve means while maintaining connection between said trailer service conduit means and said trailer emergency conduit means.

2. An automatic regulating valve for use in a compressed air brake system having a trailer brake reservoir, a trailer service line, a trailer emergency line and tractor braking means, comprising; a first chamber adapted to be connected with said reservoir, a second chamber adapted to be connected to said trailer emergency line and normally connected to said first chamber, a third chamber normally open to the atmosphere and adapted to be connected to said trailer service line, means connecting said second and third chambers, first valve means movable to close connection between said first and second chambers, second valve means normally closing connection between said second and third chambers and pneumatically controlled means adapted to close said third chamber from the atmosphere and open said second valve means upon application of air pressure when said tractor braking means are actuated and adapted to close said first valve means while leaving said second valve means open in the event of damage to said trailer service line.

3. An automatic regulating valve as set forth in claim 2 wherein said pneumatically controlled means comprising a hollow plunger open at one end and closed at the other end and provided with a hole in the side wall thereof adapted to be in communication with the atmosphere, spring means urging said plunger against said first valve means to maintain said first valve means normally open and away from said second valve means whereby the open end of said plunger communicates with said third chamber to vent said third chamber to the atmosphere, means for biasing said first and second valves to closed positions, fourth chamber means adapted to be connected to said tractor braking means and located between said second and third chambers, diaphragm means secured to said plunger and separating said fourth chamber from said third chamber whereby an increase in pressure in said fourth chamber is adapted to shift said plunger to close the open end thereof against said second valve and shift said second valve to an open position until said third and fourth chambers are in equilibrium and thereby upon a decrease in pressure in said third chamber due to a failure in the trailer service line the pressure in said fourth chamber will further shift said plunger to allow said first valve means to close while maintaining said second valve means open.

4. An automatic regulating valve according to claim 3 further comprising; a second diaphragm slidably mounted with respect to said plunger and dividing said fourth chamber into two smaller chambers adapted to be connected with respective portions of said tractor braking means.

References Cited by the Examiner

UNITED STATES PATENTS 2,850,330   9/1958   Andrews _____ 303—84

EUGENE G. BOTZ, *Primary Examiner.*